United States Patent [19]
Nihei et al.

[11] Patent Number: 5,588,328
[45] Date of Patent: Dec. 31, 1996

[54] GEAR MECHANISM IMPROVED TO REMOVE BACKLASH

[75] Inventors: Ryo Nihei; Akihiro Terada, both of Fujiyoshida; Hidenori Kurebayashi, Yamanashi, all of Japan

[73] Assignee: Fanuc Ltd., Yamanashi, Japan

[21] Appl. No.: 499,504

[22] Filed: Jul. 7, 1995

[30] Foreign Application Priority Data

Jul. 8, 1994 [JP] Japan .................... 6-157415

[51] Int. Cl.$^6$ ............... F16H 1/00; F16H 55/18
[52] U.S. Cl. .............. 74/409; 74/421 A; 74/810.1
[58] Field of Search .............. 74/409, 410, 810.1, 74/421 A; 192/89.21

[56] References Cited

U.S. PATENT DOCUMENTS

| | | | |
|---|---|---|---|
| 2,920,497 | 1/1960 | Wiken | 74/409 |
| 3,396,594 | 8/1968 | Walker | 74/409 |
| 4,147,071 | 4/1979 | Scribner et al. | 74/409 |
| 4,953,417 | 9/1990 | Baumgarten et al. | 74/409 |

*Primary Examiner*—Vinh T. Luong
*Assistant Examiner*—Troy Grabow
*Attorney, Agent, or Firm*—Nikaido, Marmelstein, Murray & Oram LLP

[57] ABSTRACT

A gear mechanism comprises a housing, an input gear of helical gear supported by the housing for rotation in first and second rotational directions and adapted to be connected to a rotational power source, an output gear of a helical gear supported by the housing for rotation, a first gear train for transmitting the rotational power from the input gear to the output gear when the input gear rotates in the first rotational direction, a second gear train for transmitting the rotational power from the input gear to the output gear when the input gear rotates in the second rotational direction.

8 Claims, 8 Drawing Sheets

GEAR MECHANISM IMPROVED TO REMOVE BACKLASH

BACKGROUND OF THE INVENTION (1) Field of the Invention

The invention relates to a gear mechanism which is improved to remove backlash.

(2) Description of the Related Art

In the prior art, there is a device for removing or adjusting backlash of a gear mechanism in which a distance between the centers of two engaging gears are changed to adjust the backlash, after which members for supporting the shafts of the gears are secured by bolts. However, this device is not suitable for mass-production since, according to the device, the gear mechanism becomes complex. Moreover, in the gear mechanism with the device for removing or adjusting the backlash, readjustment of the distance between the centers of the gears must be carried out after the installation since the distance will increase due to the wear of the gears during long operation time.

In another prior art, a gear mechanism is well known which comprises a pair of gears engaging and a spring for biasing the gears to each other to reduce the distance between the centers of the gears. However, in order to prevent the spring from being push back during the operation, the spring must have a strength to bias the gears to each other by a biasing force corresponding to the maximum transmitted torque. Therefore, the gears will wear soon due to the biasing force which is larger than than a biasing force required to remove the backlash. Moreover, the torque transmitted by the gears are limited.

Further, there is a prior art device for removing backlash between two helical gears in which one of the two helical gears is split into two parts by a plane perpendicular to the rotational axis, between which a spring is provided for biasing the split two portions in the opposited direction along a shaft thereof. However, both the split gear portions must have sufficient strength to transmit the torque. Therefore, as a result, the other helical gear engaging both the split gear portions must have a strength two times of required for transmitting the torque, which results in increasing the weight and reducing the acceleration performance of a body driven by the gear mechanism.

SUMMARY OF THE INVENTION

The invention is directed to solve the problems of the prior art.

According to the invention, there is provided a gear mechanism comprising a housing; an input gear of helical gear supported by the housing for rotation in first and second rotational direction and adapted to be connected to a rotational power source; an output gear of a helical gear supported by the housing for rotation; a first gear train for transmitting the rotational power from the input gear to the output gear when the input gear rotates in the first rotational direction; a second gear train for transmitting the rotational power from the input gear to the output gear when the input gear rotates in the second rotational direction; the first gear train having a first spline shaft rotationally supported by the housing, first and second intermediate gears mounted on the first spline shaft slidably along the shaft, and a means for biasing the first and second intermediate gears in the opposite direction along the shaft to each other; the first intermediate gear being biased such that when the input gear rotates in the first rotational direction, the first intermediate gear engages the input gear at the front, relative to the rotational direction of the input gear, sides of the tooth flanks of the input gear; the second intermediate gear being biased such that when the output gear rotates in the first rotational direction, the second intermediate gear engages the output gear at the rear, relative to the rotational direction of the input gear, sides of the tooth flanks of the output gear; the second gear train having a second spline shaft rotationally supported by the housing; third and fourth intermediate gears mounted on the second spline shaft slidably along the shaft; and a means for biasing the third and fourth intermediate gears in the opposite direction along the shaft to each other; the third intermediate gear being biased such that when the input gear rotates in the second rotational direction, the third intermediate gear engages the input gear at the front, relative to the rotational direction of the input gear, sides of the tooth flanks of the input gear; and the fourth intermediate gear being biased such that when the output gear rotates in the second rotational direction, the fourth intermediate gear engages the output gear at the rear, relative to the rotational direction of the input gear, sides of the tooth flanks of the output gear.

Further, there is provided a gear mechanism comprising a housing, a spline shaft supported by the housing for rotation in first and second rotational direction; first and second gear of helical gears mounted mounted on the spline shaft slidably along the shaft, third gear Of helical gears rotationally supported by the housing, a means for biasing the first and second gears in the opposite direction along the spline shaft, and a helix angle of the helical gears of the input, output and intermediate gears is defined by the following inequality.

$$\tan\beta < \mu \cdot r/rs$$

where
- $\beta$: helix angle of the helical gear
- $rs$: pitch circle radius of the spline
- $r$: pitch circle radius of the helical gear
- $\mu$: maximum static friction coefficient

DESCRIPTION OF THE PREFERRED EMBODIMENTS

The preferred embodiments will described hereinafter with reference to the attached drawings in which the inventive gear mechanism is applied to a device for driving a robot arm as an example. However, the invention is not limited to the embodiment.

Figure 1:
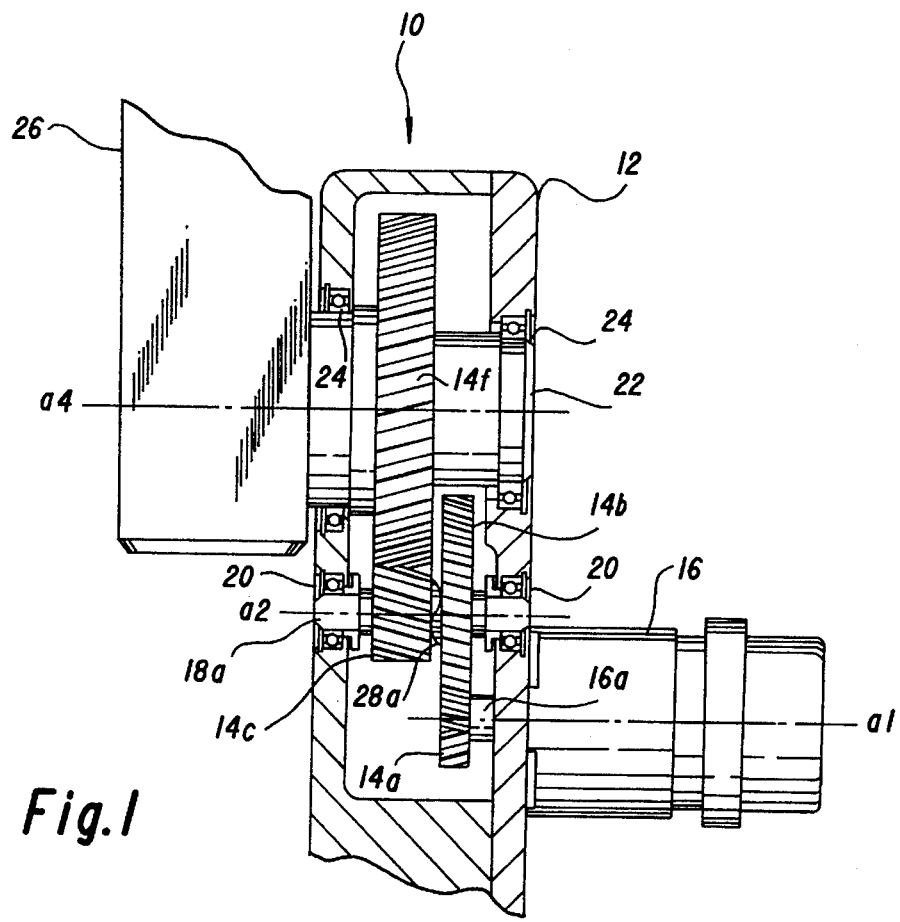
FIG. 1 is a section of the gear mechanism according to the first embodiment of the invention.
Figure 2:
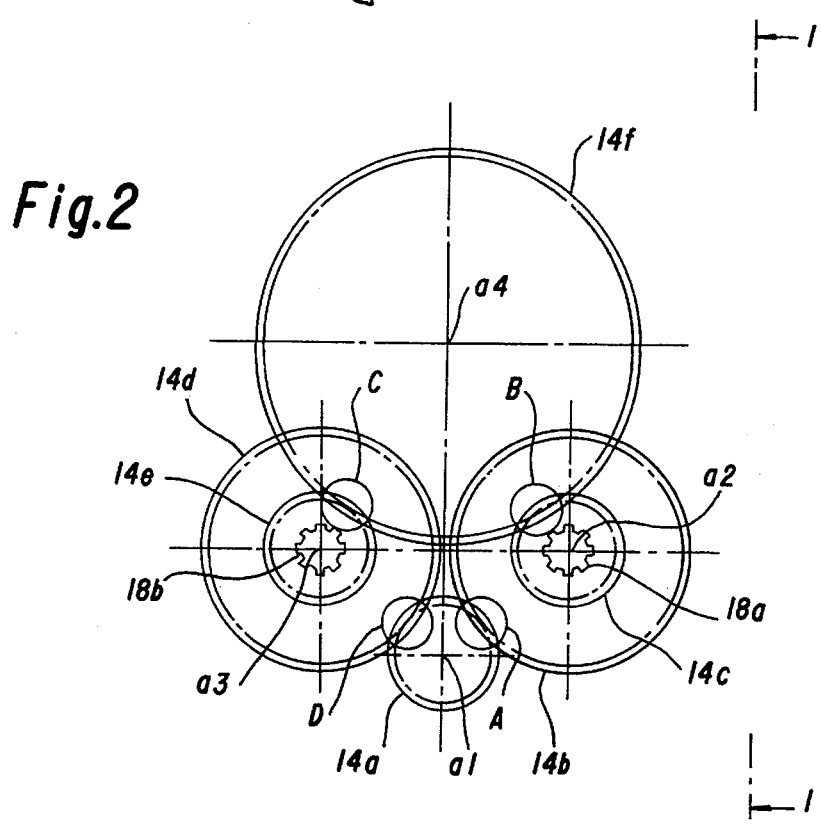
FIG. 2 is a schematic front view of the gear mechanism of FIG. 1.

With reference to FIGS. 1 and 2, a gear mechanism 10 according to the first embodiment of the invention comprises an input gear 14a, a first gear train which comprises first and second intermediate gears 14b and 14c, a second gear train which comprises third and fourth intermediate gears 14d and 14e, and an output gear 14f. The first and second gear trains are accommodated within a housing 12. The gears 14a through 14f are helical gears. The input gear 14a is mounted on a output shaft 16a of a drive source, such as a servomotor 16 which can rotate in two rotational directions. The output gear 14f is mounted on a rotational shaft 22 of a driven body, e.g., a robot arm 26. The rotational shaft 22 is supported by the housing 12 for rotation through a bearing 24.

The first and second intermediate gears 14b and 14c of the first gear train engage the input gear 14a and the output gear 14f respectively. The third and fourth intermediate gear 14d and 14e of the second gear train engage the input gear 14a and the output gear 14f respectively. As described hereinafter, when the input gear 14a rotates in a first direction, for example in the counter-clockwise direction in the drawings, the power is transmitted from the input gear 14a to the output gear 14f through the first gear train. On the other hand, when the input gear 14a rotates in a second direction, for example in the clockwise direction in the drawings, the power is transmitted from the input gear 14a to the output gear 14f through the second gear train, The first and second intermediate gears 14b and 14c of the first gear train are mounted on a first spline shaft 18a slidably along the shaft. The first spline shaft 18a is supported by the housing 12 for rotation through a pair of bearings 20. The third and fourth intermediate gears 14d and 14e of the second gear train are also mounted on a second spline shaft 18b slidably along the shaft. The second spline shaft 18b is also supported by the housing 12 for rotation through a pair of bearings (not shown).

As is well known, in the constitution of the gear mechanism of FIGS. 1–4, the output shaft 14f rotates in the same direction of the input gear 14a. That is, the output gear 14f rotates in the counter-clockwise direction when the input gear 14a rotates in the counter-clockwise direction, and in the clockwise direction when the input gear 14a rotates in the clockwise direction.

Figure 3:
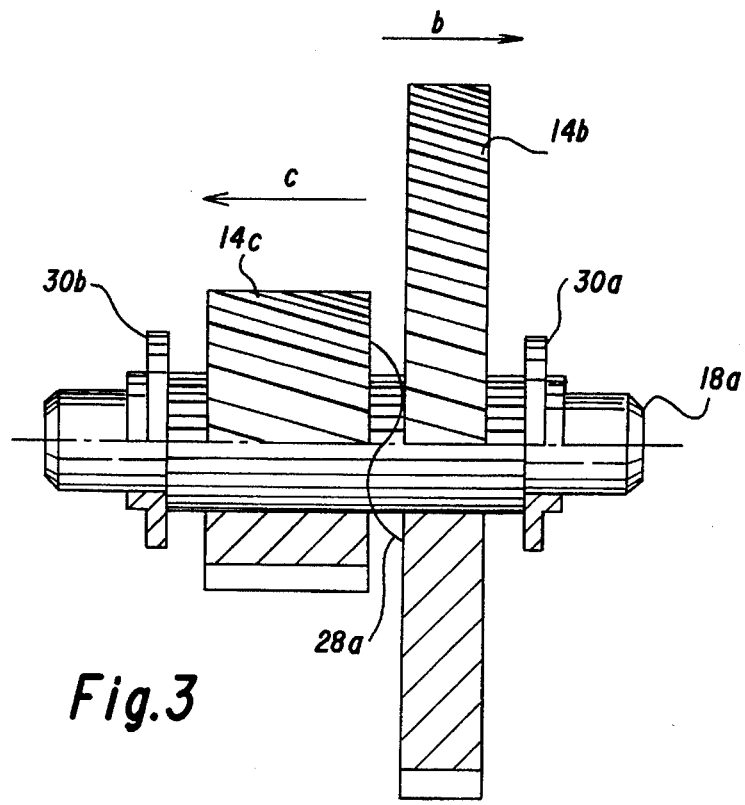
FIG. 3 is a side view of the first gear train of the gear mechanism of FIG. 1.

As shown in FIG. 1 and 3, a first spring 28a in the form of a ring is provided between the first and the second intermediate gears 14b and 14c. The first spring 28a is the same as that of the prior art which is provided between split helical gears for removing backlash between the split helical gears and a helical gear engaging the split gears.

The first and second intermediate gears 14b and 14c are biased along the first spline shaft 18a in the opposite directions to each other. Namely, the first intermediate gear 14b is biased along the first spline shaft 18a in the direction indicated by an arrow b, and the second intermediate gear 14c is biased along the first spline shaft 18a in the direction indicated by an arrow c in FIG. 3. Thus, the first spring 28a moves the first and second intermediate gears 14b and 14c, along the first spline shaft 18a in the direction b and c, to bias them against the input gear 14a and the output gear 14f respectively.

The movement of the first intermediate gear 14b in the direction b is stopped by the engagement with the input gear 14a. Since the first intermediate gear 14b is biased to the input gear 14a by the first spring 28a, the first intermediate gear 14b always engages the input gear 14a with its one sides of the tooth flanks contacting one sides of those of the input gear 14a as described hereinafter. The movement of the second intermediate gear 14c in the direction c is also stopped by the engagement with the output gear 14f. Since the second intermediate gear 14c is biased to the output gear 14f by the first spring 28a, the second intermediate gear 14c always engages the output gear 14c with its one sides of the tooth flanks contacting one sides of those of the output gear 14f as described hereinafter.

Figure 4:
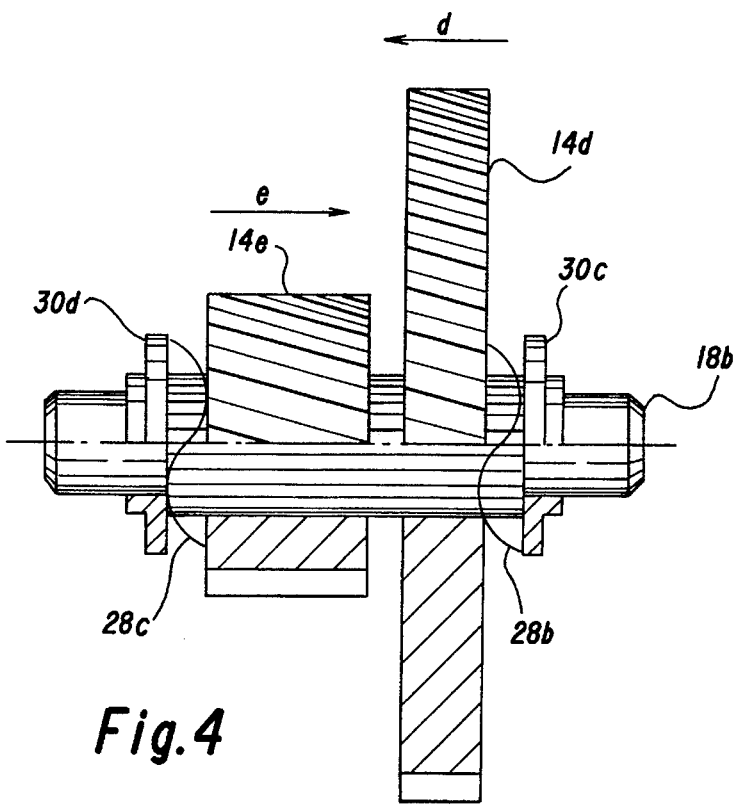
FIG. 4 is a side view of the second gear train of the gear mechanism of FIG. 1.

With reference to FIG. 4, a stopper ring 30c is secured to the second spline shaft 18b at an axial position outside of the third intermediate gear 14d of the second gear train. A second spring 28b in the form of a ring is provided between the third intermediate gear 14d and the stopper ring 30c. The second spring 28b is substantially identical to the first spring 28a. The third intermediate gear 14d is biased in a direction indicated by an arrow d in FIG. 4 along the second spline shaft 18b by the second spring 28b. Thus, the second spring 28b moves the third intermediate gear 14d, along the second spline shaft 18b in the direction d, to bias it against the input gear 14a.

The movement of the third intermediate gear 14d in the direction d is stopped by the engagement with the input gear 14a. Since the third intermediate gear 14d is biased to the input gear 14a by the second spring 28b, the third intermediate gear 14d always engages the input gear 14a with its one sides of the tooth flanks contacting the other sides of those of the input gear 14a as described hereinafter.

A stopper ring 30d is secured to the second spline shaft 18b at an axial position outside of the fourth intermediate gear 14e of the second gear train. A third spring 28c in the form of a ring is provided between the fourth intermediate gear 14e and the stopper ring 30d. The third spring 28c is substantially identical to the first and second springs 28a and 28b. The fourth intermediate gear 14e is biased in the opposite direction indicated by an arrow e in FIG. 4 along the second spline shaft 18b by the third spring 28c. Thus, the third spring 28c moves the fourth intermediate gear 14e, along the second spline shaft 18b in the direction e, to bias it against the output gear 14f.

The movement of the fourth intermediate gear 14e in the direction e is stopped by the engagement with the output gear 14f. Since the fourth intermediate gear 14e is biased to the output gear 14f by the third spring 28c, the second intermediate gear 14c always engages the output gear 14f with its one sides of the tooth flanks contacting the other sides of the output gear 14f as described hereinafter.

FIGS. 5–8 illustrate fragmentary enlarged portions of the engagement between the gears which are indicated by reference characters A through D in FIG. 1 respectively.

Helix angle of the helical gears and the directions of the biasing by the springs decide the sides of the engagement between the helical gears. The first and third intermediate gears 14b and 14d engage the input gear 14a, therefore, the first and third intermediate gears 14b and 14d have the same helix angle. The first and third intermediate gears 14b and 14d are biased, in the opposite directions to each other, by the first and second springs 28a and 28b respectively as shown in FIGS. 3 and 4. Therefore, the first and third intermediate gears 14b and 14d engage the input gear 14a at the opposite sides of the tooth flanks of the input gear 14a.

In particular, in this embodiment, when the input gear 14a rotates in the counter-clockwise direction as shown by solid line, the first and third intermediate gears 14b and 14d engage the front and rear sides of the tooth flanks of the input gear 14a (FIGS. 5 and 8) respectively. Therefore, in this case, the power is transmitted from the input gear 14a to the first intermediate gear 14b of the first gear train, but the power is not transmitted to the first intermediate gear 14d of the second gear train. On the other hand, when the input gear 14a rotates in the clockwise direction as shown by dashed line, the first and third intermediate gears 14b and 14d engage the rear and front sides of the tooth flanks of the input gear 14a (FIGS. 5 and 8) respectively. Therefore, in this case, the power is transmitted from the input gear 14a to the third intermediate gear 14d of the second gear train, but the power is not transmitted to the first intermediate gear 14b of the first gear train.

The second and fourth intermediate gears 14c and 14e engage the output gear 14f, therefore, the second and fourth intermediate gears 14c and 14e have the same helix angle. The second and fourth intermediate gears 14c and 14e are biased, in the opposite directions to each other, by the first and third springs 28a and 28c respectively as shown in FIGS. 3 and 4. Therefore, the second and fourth intermediate gears 14c and 14e engage the output gear 14f at the opposite sides tooth flanks of the output gear 14f.

In particular, in this embodiment, when the output gear 14f rotates in the counter-clockwise direction as shown by solid lines (in this case, the input gear 14a rotates in the counter-clockwise direction), the second and fourth intermediate gears 14b and 14d engage the rear and front sides of the tooth flanks of the output gear 14f (FIGS. 6 and 7) respectively. Therefore, in this case, the power is transmitted from the second intermediate gear 14c of the first gear train to the output gear 14f, but the power is not transmitted from the second gear 14e of the second gear train. On the other hand, when the output gear 14f rotates in the clockwise direction as shown by dashed lines (in this case, the input gear 14a rotates in the clockwise direction), the second and fourth intermediate gears 14b and 14d engage the front and rear sides of the tooth flanks of the output gear 14f (FIGS. 6 and 7) respectively. Therefore, in this case, the power is transmitted from the second intermediate gear 14d of the second gear train to the output gear 14f, but the power is not transmitted from the fourth gear 14c of the first gear train.

Figure 5:
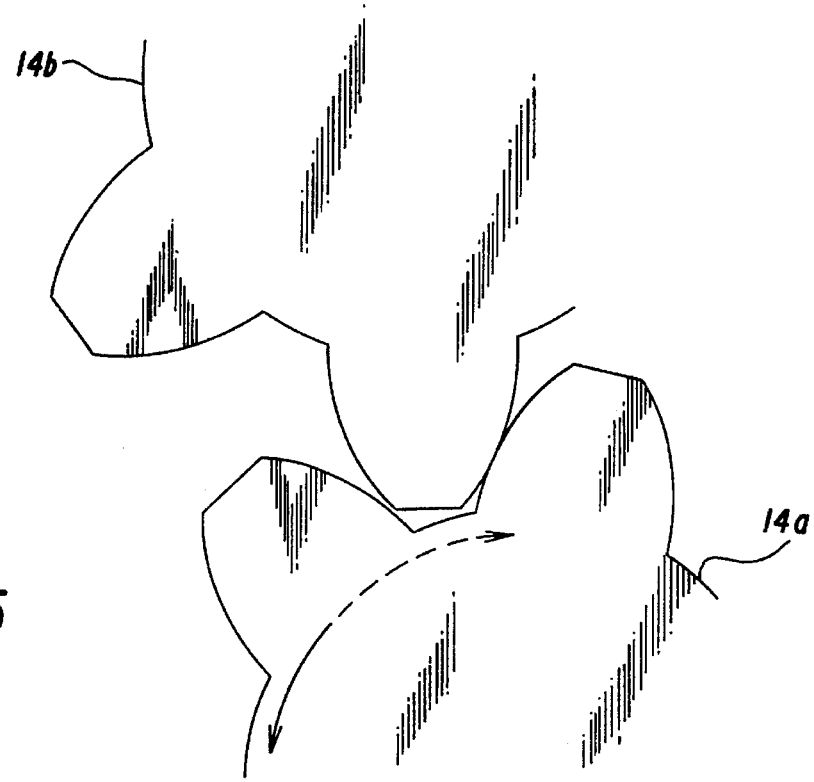
FIG. 5 illustrates an enlarged portion of the engagement between the input gear and the first intermediate gear, which is indicated by A in FIG. 2.
Figure 6:
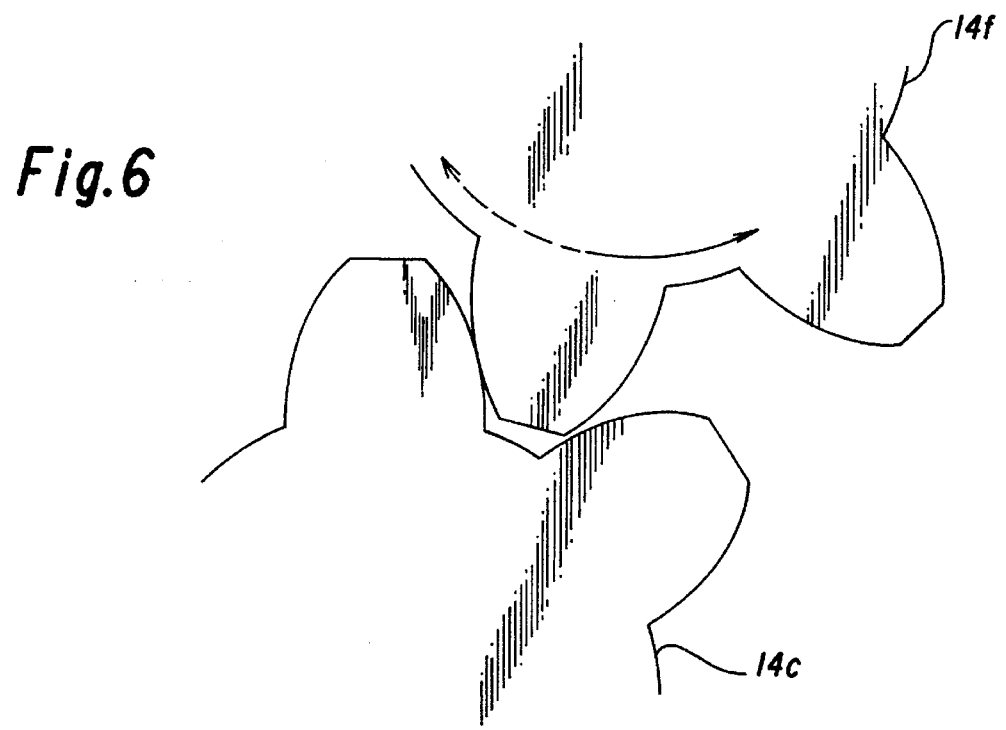
FIG. 6 illustrates an enlarged portion of the engagement between the second intermediate gear and the output gear, which is indicated by B in FIG. 2.
Figure 7:
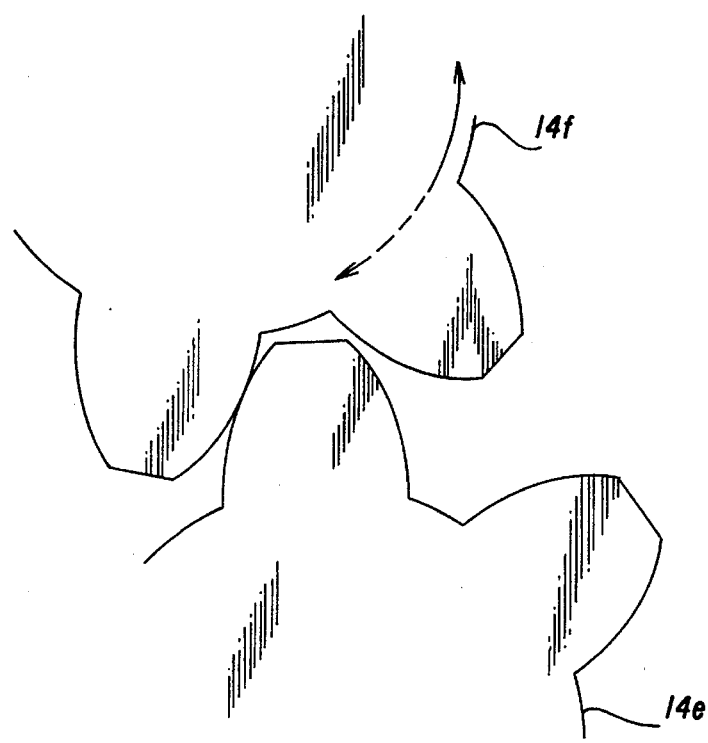
FIG. 7 illustrates an enlarged portion of the engagement between the output gear and the fourth intermediate gear, which is indicated by C in FIG. 2.
Figure 8:
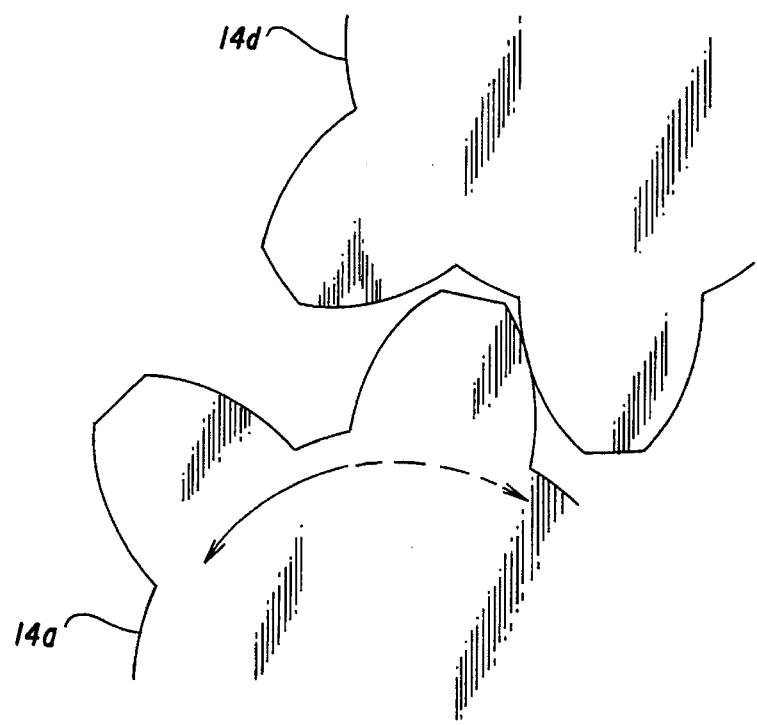
FIG. 8 illustrates an enlarged portion of the engagement between the input gear and the third intermediate gear, which is indicated by D in FIG. 2.

When the input gear 14a rotates in the counter-clockwise direction in FIGS. 1, 5 and 8, the first intermediate gear 14b of the first gear train is driven in the clockwise direction by the input gear 14a since the first intermediate gear 14b of the first gear train engages the input gear 14a at the front sides, relative to the rotational direction, of the tooth flanks of the input gear 14a. The second intermediate gear 14c is rotated in the clockwise direction through the first spline shaft 18a rotating with the first intermediate gear 14b mounted thereon. Thus, the output gear 14f is driven in the counter-clockwise direction through the engagement with the second intermediate gear 14c which contacts the output gear 14f at the rear sides, relative to the rotational direction of the output gear 14f, of the tooth flanks of the output gear 14f.

The output gear 14f rotating in the counter-clockwise direction rotates the fourth intermediate gear 14e of the second gear train in the clockwise direction since the second intermediate gear 14e engages the output gear 14f at the front sides, relative to the rotational direction of the output gear 14e, of the tooth flanks of the output gear 14e. The third intermediate gear 14d is rotated in the clockwise direction through the second spline shaft 18b rotating with the fourth intermediate gear 14e mounted thereon, It will be understood, from the above description, although the third intermediate gear 14d engages the input gear 14a at the rear sides, relative to the rotational direction, of the tooth flanks of the input gear 14a, there is no substantial power transmission between the third intermediate gear 14d and the input gear 14a. The power is transmitted from the input gear 14a to the output gear 14f through the first and second intermediate gears 14b and 14c of the first gear train. The third and fourth intermediate gears 14d and 14e of the second gear train do not contribute the power transmission when the input gear 14a rotates in the counter-clockwise direction.

On the other hand, when the input gear 14a rotates in the clockwise direction in FIGS. 1, 5 and 8, the third intermediate gear 14d of the second gear train is driven in the counter-clockwise direction by the input gear 14a since the third intermediate gear 14d engages the input gear 14a at the front sides, relative to the rotational direction, of the tooth flanks of the input gear 14a. The fourth intermediate gear 14e is rotated in the counter-clockwise direction through the second spline shaft 18b rotating with the first intermediate gear 14d mounted thereon. Thus, the output gear 14f is driven in the clockwise direction through the engagement with the fourth intermediate gear 14e which contacts the output gear 14f at the rear sides, relative to the rotational direction of the output gear 14f, of the tooth flanks of the output gear 14f.

The output gear 14f rotating in the clockwise direction rotates the second intermediate gear 14c of the first gear train in the counter-clockwise direction since the second intermediate gear 14c engages the output gear 14f at the front sides, relative to the rotational direction of the output gear 14e, of the tooth flanks of the output gear 14e. The first intermediate gear 14b is rotated in the counter-clockwise direction through the first spline shaft 18a rotating with the second intermediate gear 14c mounted thereon.

It will be understood, from the above description, although the first intermediate gear 14b of the first gear train engages the input, gear 14a at the rear sides, relative to the rotational direction, of the tooth flanks of the input gear 14a, there is no substantial power transmission between the first intermediate gear 14b of the first gear train and the input gear 14a. The power is transmitted from the input gear 14a to the output gear 14f through the third and fourth gears 14d and 14e of the second gear train, and the first and second gears 14b and 14c of the first gear train do not contribute the power transmission when the input gear 14a rotates in the clockwise direction.

The gear mechanism comprises two set of intermediate gears which increase the number of the elements. However, the weight of the input and output gears is reduced compared with the prior art, in particular, compared with the gear mechanism which comprises split intermediate gears and a spring therebetween since the input and output gears are not necessary to have doubled width to engage the split gears. Therefore, the inventive gear mechanism can remove the backlash with minimum increase of the weight of the input and output gears.

Figure 9:
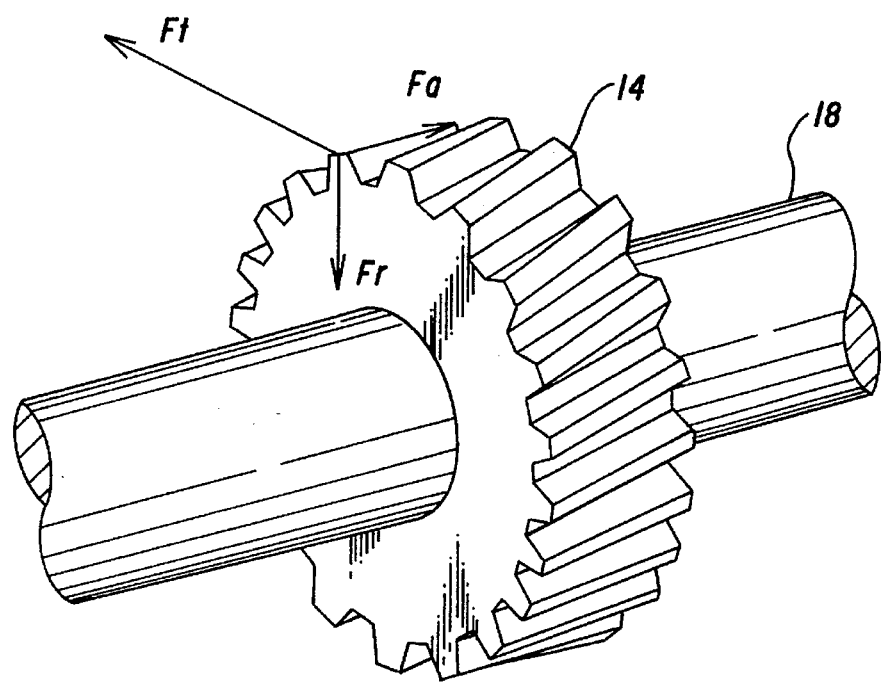
FIG. 9 is a schematic and perspective view of a helical gear on a spline shaft, and illustrates forces on the helical gear.
Figure 10:
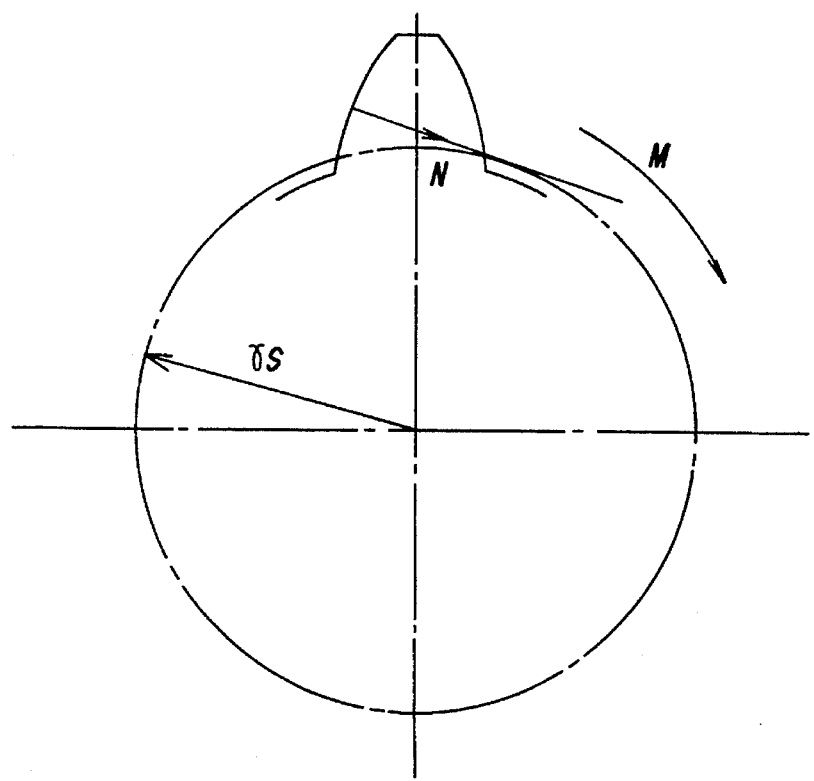
FIG. 10 is schematic illustration of a spline shaft and forces on the shaft.

With reference to FIGS. 9 and 10, the relationship between the helix angle of the intermediate gears and the friction between the spline shafts and the intermediate gears will be described hereinafter. FIG. 9 illustrates forces on a helical gear in general. FIG. 10 illustrates forces on a spline shaft in general.

In FIGS. 9 and 10, the following notation is defined.

Ft: tangential component
Fr: radial component
Fa: axial thrust
N: perpendicular component to the tooth flank
rs: pitch circle radius of the spline With reference to FIG. 9, there is shown a helical gear 14 which is mounted on a spline shaft 18 slidably along the shaft, The moment on the helical gear 14 is defined by the following equation (1).

$$M = F_t \cdot r \qquad (1)$$

where

M: moment on the spline shaft
r: pitch circle radius of the helical gear

The axial thrust on the helical gear is defined by the following equation (2).

$$F_a = F_t \cdot \tan\beta \qquad (2)$$

where

β: helix angle of the helical gear

From equations (1) and (2), we obtain the following equation (3).

$$F_a = M/r \cdot \tan\beta \qquad (3)$$

On the other hand, the moment on the spline shaft is defined by the following equation (4).

$$M = N \cdot r_s \qquad (4)$$

Further, the maximum static friction between the helical gear 14 and the spline shaft 18 is defined by the following equation (5).

$$F = \mu \cdot N \qquad (5)$$

where

F: maximum static friction force
μ: maximum static friction coefficient

From equations (4) and (5), we obtain the following equation (6).

$$F = \mu \cdot M/r_s \qquad (6)$$

The condition in which the thrust can not make the helical gear 14 to slide along the spline shaft 18 is defined by the following inequality (7).

$$F > F_a \qquad (7)$$

Thus, from equations (3), (6) and inequality (7), we obtain the following inequality.

$$\tan\beta < \mu \cdot r/r_s \qquad (8)$$

When the condition defined by inequality (8) is satisfied, the thrust on the helical gear 14 can not make the helical gear 14 to slide along the spline shaft 18.

Thus, if the intermediate gears 14b–14e satisfy the condition defined by inequality (8), the thrust on the intermediate gears 14b–14e can not move the gears against the biasing of the springs 28a, 28b and 28c. This reduces the strength of the springs to the minimum which can move the gears along the spline shaft at no load on the gear mechanism.

Figure 11:
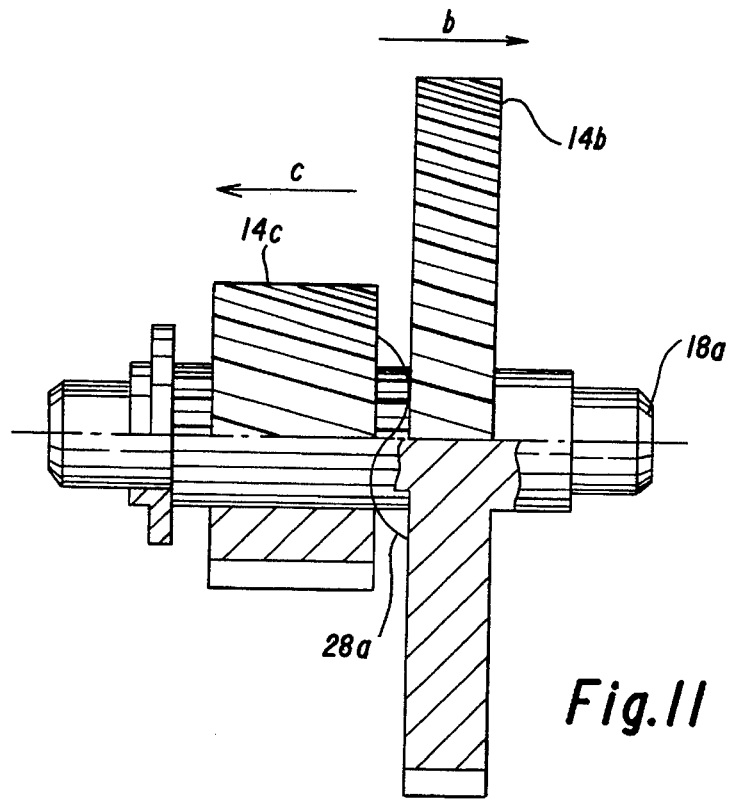
FIG. 11 is a side view of the first gear train of the gear mechanism according to the second embodiment.
Figure 12:
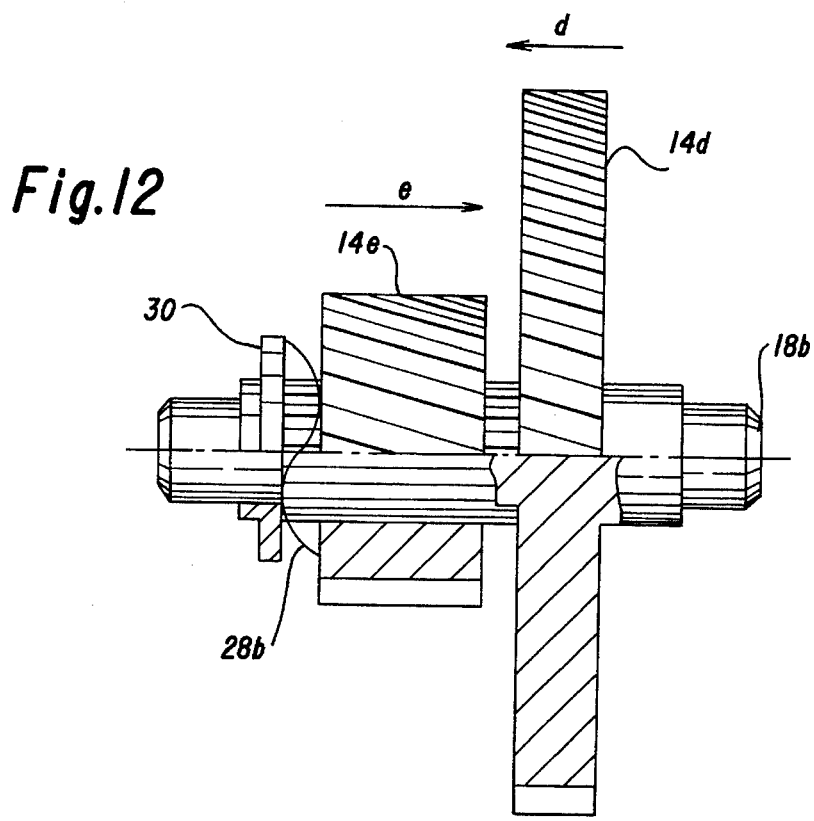
FIG. 12 is a side view of the second gear train of the gear mechanism according to the second embodiment.

With reference to FIGS. 11 and 12, the second embodiment of the invention will be described hereinafter. In the following description, the elements identical to those of the first embodiment are indicated by the same reference number.

The second embodiment is substantially the same as the first embodiment, except for the first and third intermediate gears of the first and second gear trains are fixed on the first and the second spline shafts respectively.

With reference to FIG. 11, a first intermediate gear 15a of the first gear train is fixed on the first spline shaft 18a. The first spline shaft 18a is mounted on the housing (not shown) rotatably about and slidably along its axis. The spring 28a biases the first and second intermediate gears 15a and 14c in the opposite directions indicated by the arrows b and c in FIG. 11, Thus, the first intermediate gear 15a moves, with the first spline shaft 18a, in the direction b to engage the input gear (not shown), and the second intermediate gear 14c moves, in the direction c along the first spline shaft 18a, to engage the output gear (not shown).

With reference to FIG. 12, a third intermediate gear 15b of the second gear train is fixed on the second spline shaft 18b. The second spline shaft 18b is mounted on the housing (not shown) rotatably about and slidably along its axis. The spring 28c biases the third and fourth intermediate gears 15b and 14e in the opposite directions indicated by the arrows d and e in FIG. 12. Thus, the third intermediate gear 15b moves, with the second spline shaft 18b, in the direction d to engage the input gear (not shown), and the fourth intermediate gear 14e moves, in the direction e along the second spline shaft 18a, to engage the output gear (not shown).

Other constitutions and operational functions are the same as the first embodiment.

Figure 13:
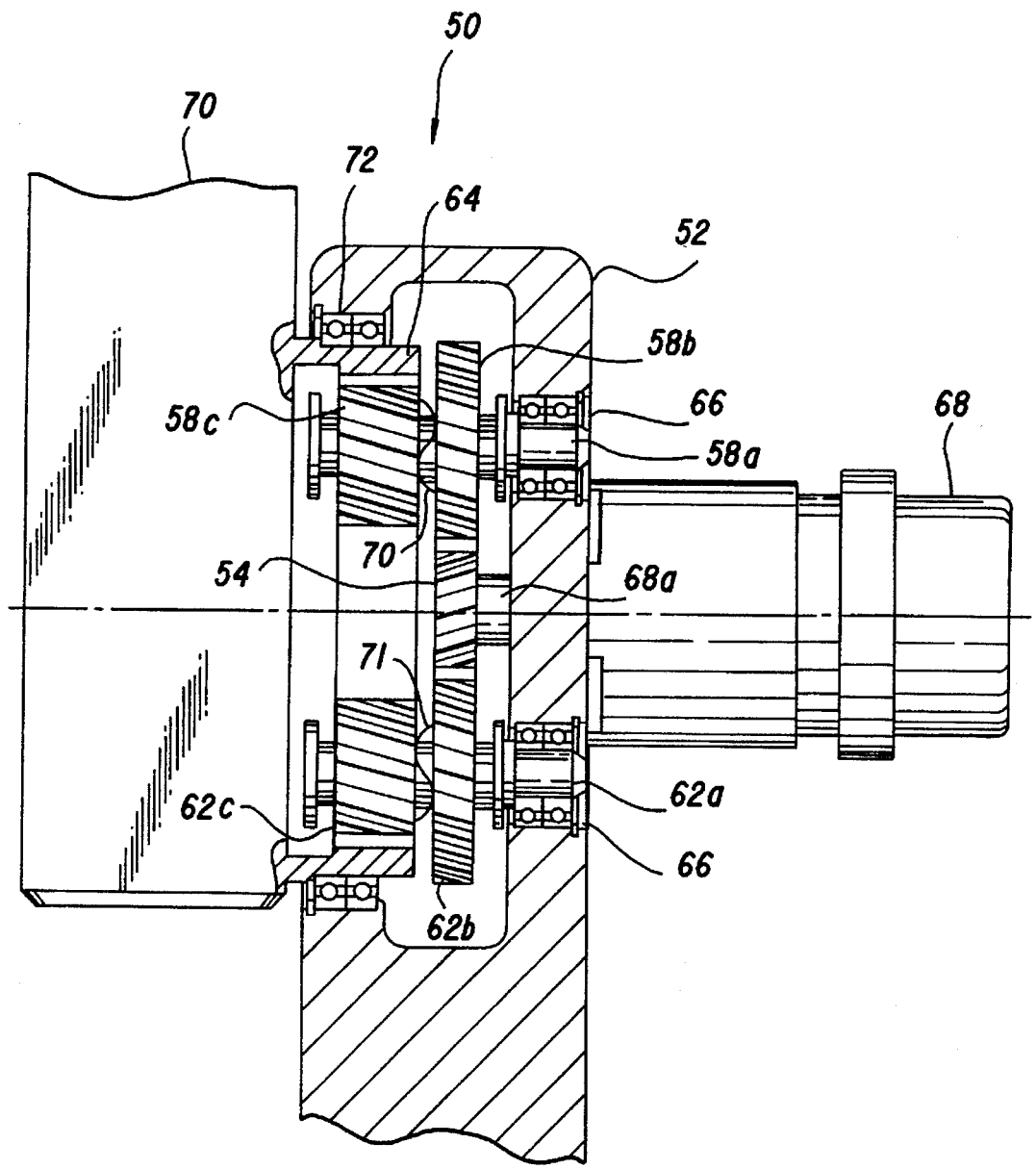
FIG. 13 is a section of the gear mechanism according to the third embodiment of the invention.
Figure 14:
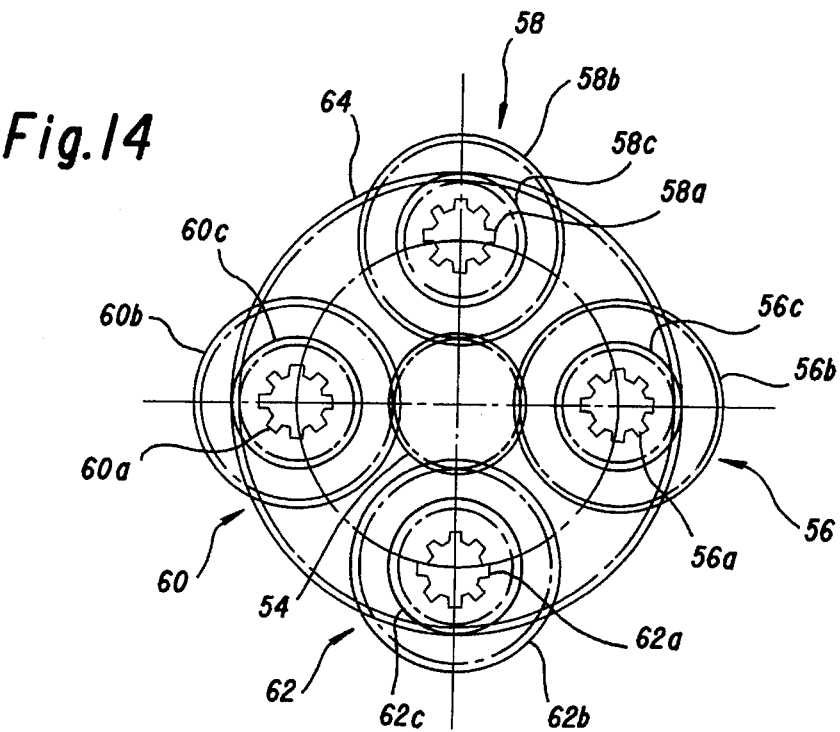
FIG. 14 is a schematic front view of the gear mechanism of FIG. 13.

With reference to FIGS. 13 and 14, the third embodiment of the invention will be described hereinafter.

The gear mechanism according to the third embodiment comprises an input gear 54, a pair of first gear trains 58 and 56, a pair of second gear trains 56 and 60, and an output gear 64. The pairs of the first and second gear trains are accommodated within a housing 52. As shown in FIG. 14, The pairs of the first and second gear trains 58 and 62, and 56 and 60 are displaced equally spaced about the rotational axis of the input and output gears 54 and 64. The input gear 54 is mounted on an output shaft of a motor 68 which is mounted to the housing 52 and rotatable in two direction.

The first gear trains 56 and 62 comprise first intermediate gears 56b and 62b and second intermediate gears 56c and 62c respectively. The second gear trains 56 and 60 comprise third intermediate gears 56b and 60b and fourth intermediate gears 56c and 60c respectively. The input, output and intermediate gears are all helical gears. In particular, the input and intermediate gears are external gears. On the other hand, the output gear 64 is internal gear. The output gear 64 forms a rotational shaft, which is mounted to the housing for rotation, of a driven body, a robot arm 70 in this embodiment.

The first intermediate gears 58b and 62b engage the input gear 54. The second intermediate gears 58c and 62c engage the output gear 64. On the other hand, the third intermediate gears 56b and 60b engage the input gear 54. The fourth intermediate gears 56c and 60c engage the output gear 64.

The first intermediate gears 58b and 62b are mounted on spline shafts 58a and 62a slidably along the shafts. The second intermediate gears 58c and 62c of the pair of the first gear trains are also mounted on the spline shafts 58a and 62a slidably along the shafts.

The third intermediate gears 56b and 60b are mounted on spline shafts 56a and 60a slidably along the shafts. The fourth intermediate gears 56c and 60c are also mounted on the spline shafts 56a and 60a slidably along the shafts.

Springs 70 and 71 in the form of a ring are provided, between the first and second intermediate gears 58b and 58c, and between the third and fourth intermediate gears 62b and 62c respectively for biasing the first and second gears 58b and 58c along the spline shaft 58a, and the third and fourth gears 62b and 62c along the spline shaft 62a, in the opposite direction to each other (FIG. 13). The springs 70 and 71 are the same as the first embodiment.

Springs (not shown), same as the springs 70 and 71, are provided in the pair of the second gear trains 56 and 60 for biasing the third and fourth gears 56b and 56c along the spline shaft 56a, and the third and fourth gears 60b and 60c along the spline shaft 60a, in the opposite direction to each other (FIG. 13).

It will be understood that the gear mechanism of FIGS. 13 and 14 has two ways to transmit the power from the input gear 54 to the output gear 64. That is, the power is transmitted from the input gear 54 to the output gear 64 through the first gear trains 58 and 62 when the input gear 54 rotates in the counter-clockwise direction, and through the second gear trains 56 and 60 when the input gear 54 rotates in the clockwise direction. The first intermediate gears 58b and 62b of the first gear trains always engage the input gear 54 at the front sides of the tooth flanks of the input gear 54 when the input gear 54 rotates in the counter-clockwise direction. The third intermediate gears 56b and 60b of the second gear trains always engage the input gear 54 at the front sides of the tooth flanks of the input gear 54 when the input gear 54 rotates in the clockwise direction. The second intermediate gears 58c and 62c of the first gear trains always engage the output gear 64 at the rear sides of the tooth flanks of the output gear 64 when the input gear 54 rotates in the counter-clockwise direction. The fourth intermediate gears 56c and 60c of the second gear trains always engage the output gear 64 at the rear sides of the tooth flanks of the output gear 64 when the input gear 54 rotates in the clockwise direction. Thus, in the gear mechanism of the third embodiment, the backlash is removed as is the preceding embodiments.

By using helical gears which satisfy the condition defined by inequality (8), the thrust on the intermediate gears is canceled by the friction between the intermediate gears and the spline shafts.

Figure 15:
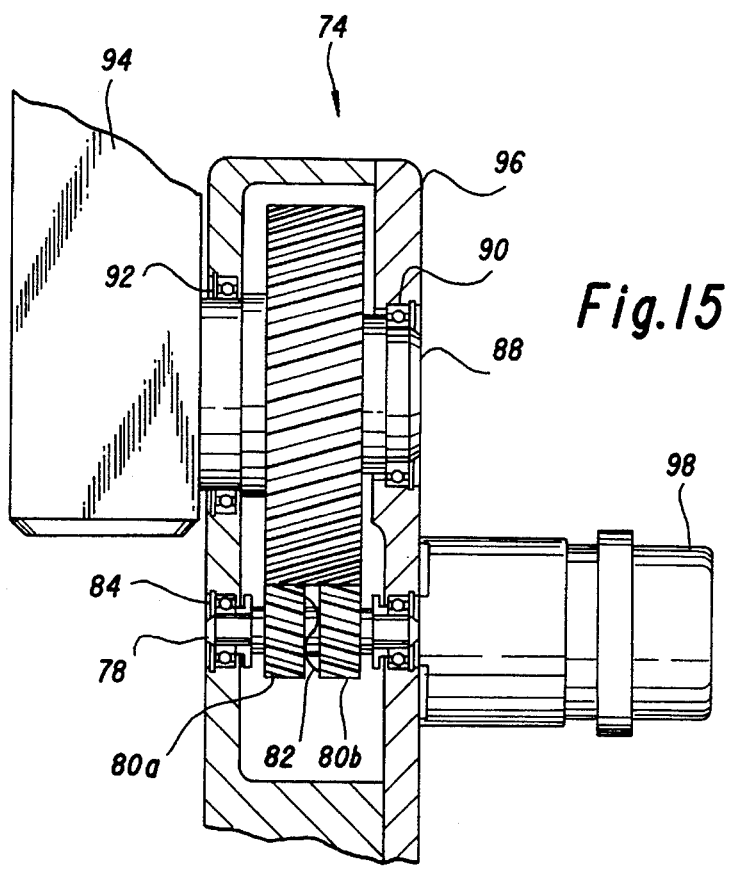
FIG. 15 is a section of the gear mechanism according to the fourth embodiment of the invention.

With reference to FIG. 15, the fourth embodiment will be described. The gear mechanism 74 comprises first and second input gears 80a and 80b, and an output gear 76. The first and second input gears 80a and 80b and the output gear 76 are helical gears. The first and second input gears 80a and 80b are mounted on a spline shaft 78 slidably along the shaft. The spline shaft 78 is mounted on a housing 96 for rotation, and connected to an output shaft of a servo motor 98. As shown in FIG. 15, the first and second input gears 80a and 80b directly engage the output gear 76 without any intermediate gears. The output gear 76 is mounted to a rotational shaft 88 of a robot arm 94 which is driven by the servo motor 94 through the gear mechanism 74. The rotational shaft 88 is supported by the housing 96 through bearings 90 and 92.

A spring 82 in the form of a ring is provided between the first and second input gears 80a and 80b for biasing the input gears in the opposite directions along the spline shaft 79. Thus, the backlash between the output gear 76 and the input gears 80a and 80b is removed as mentioned with reference with FIGS. 1–4.

By using helical gears which satisfy the condition defined by inequality (8), the thrust on the input gears is canceled by the friction between the input gears and the spline shaft.

While the preferred embodiments have been described, variations thereto will occur to those skilled in the art within the scope of the invention.

For example, in the first and second embodiments, the gear mechanisms of the invention comprise one set of the first and second gear trains. In the third embodiment, the gear mechanism comprises two sets of the first and second gear trains. However, they are only examples, and the invention is limited to them. The gear mechanism of the invention can comprise three sets or more of first and second gear trains. Further, when the torque to be transmitted is different depending on the rotational direction of the input gear(s), the gear mechanism of the invention can comprise the different number of sets of the gear trains between the first and second gear trains.

Further, in the first, second and fourth embodiments, the output gears have the external teeth, in the third embodiment, the output gear has the internal teeth while the input gears have the internal teeth in all embodiments. However, the input gear can be an internal helical gear.

Further, in the preceding embodiments, the gears are the helical gears rotational about axes extending parallel to each other. However, the invention is not limited to this. That is, in this specification, the term "a helical gear" can include at least a helical bevel gear, a straight bevel gear, a spiral bevel gear, a hypoid gear, a crossed helical gear and a crown gear.

Further, in the preceding embodiments, the first and second intermediate gears, and the third and fourth intermediate gears are mounted the same spline shafts. However, the first and second intermediate gears can be mounted the separated shafts which are connected by a suitable connecting means, such as a belt and pulleys. Furthermore, in this case, the connection means can include the inventive gear mechanism. That is, the inventive gear mechanism can be form a transmission which includes multiple stages of the gear mechanism.

Further, in the fourth embodiment of the invention, the gear mechanism comprises two input gears and one output gear. However, the invention includes a gear mechanism which includes a input gear and two output gears mounted on a spline shaft slidably along the shaft.

We claim:

1. A gear mechanism comprising:

a housing;

an input gear of helical gear supported by the housing for rotation in first and second rotational directions and adapted to be connected to a rotational power source, the input gear having tooth flanks;

an output gear of a helical gear supported by the housing for rotation, the output gear having tooth flanks;

a first gear train for transmitting the rotational power from the input gear to the output gear when the input gear rotates in the first rotational direction;

a second gear train for transmitting the rotational power from the input gear to the output gear when the input gear rotates in the second rotational direction;

the first gear train having a first spline shaft rotationally supported by the housing, first and second intermediate gears mounted on the first spline shaft slidably along the shaft, and a means for biasing first and second intermediate gears in the opposite directions along the shaft;

the first intermediate gear being biased such that when the input gear rotates in the first rotational direction, the first intermediate gear engages the input gear at the front, relative to the rotational direction of the input gear, sides of the tooth flanks of the input gear;

the second intermediate gear being biased such that when the output gear rotates in the first rotational direction, the second intermediate gear engages the output gear at the rear, relative to the rotational direction of the input gear, sides of the tooth flanks of the output gear;

the second gear train having a second spline shaft rotationally supported by the housing; third and fourth intermediate gears mounted on the second spline shaft slidably along time shaft; and a means for biasing third and fourth intermediate gears in the opposite directions along the shaft;

the third intermediate gear being biased such that when the input gear rotates in the second rotational direction, the third intermediate gear engages the input gear at the front, relative to the rotational direction of the input gear, sides of the tooth flanks of the input gear; and the fourth intermediate gear being biased such that when the output gear rotates in the second rotational direction, the fourth intermediate gear engages the output gear at the rear, relative to the rotational direction of the input gear, sides of the tooth flanks of the output gear.

2. A gear mechanism according to claim 1 in which a helix angle of the helical gears of the input, output and intermediate gears is defined by the following inequality:

$$tan\beta < \mu \cdot r/rs$$

where $\beta$: helix angle of the helical gear rs: pitch circle radius of the spline r: pitch circle radius of the helical gear $\mu$: maximum static friction coefficient.

3. A gear mechanism according to claim 2 in which the input, output and intermediate gears are external gears.

4. A gear mechanism according to claim 2 in which the input and intermediate gears are external gears, and the output gear is an internal gear.

5. A gear mechanism comprising:

a housing;

an input gear of helical gear supported by the housing for rotation in first and second rotational directions and adapted to be connected to a rotational power source, the input gear having tooth flanks;

an output gear of a helical gear supported by the housing for rotation, the output gear having tooth flanks;

a first gear train for transmitting the rotational power from the input gear to the output gear when the input gear rotates in the first rotational direction;

a second gear train for transmitting the rotational power from the input gear to the output gear when the input gear rotates in the second rotational direction;

the first gear train having a first spline shaft supported by the housing rotationally about and slidably along the axis thereof, a first intermediate gear fixedly mounted on the first spline shaft, a second intermediate gear mounted on the first spline shaft slidably along the shaft, and a means for biasing the first and second intermediate gears in opposite directions along the shaft to each other;

the first intermediate gear being biased such that when the input gear rotates in the first rotational direction, the first intermediate gear engages the input gear at the front, relative to the rotational direction of the input gear, sides of the tooth flanks of the input gear;

the second intermediate gear being biased such that when the output gear rotates in the first rotational direction, the second intermediate gear engages the output gear at the rear, relative to the rotational direction of the input gear, sides of the tooth flanks of the output gear;

the second gear train having a second spline shaft supported by the housing rotationally about and slidably along the axis thereof; a third intermediate gear fixedly mounted on the second spline shaft, a fourth intermediate gear mounted on the second spline shaft slidably along the shaft; and a means for biasing the third and fourth intermediate gears in opposite directions along the shaft;

the third intermediate gear being biased such that when the input gear rotates in the second rotational direction, the third intermediate gear engages the input gear at the front, relative to the rotational direction of the input gear, sides of the tooth flanks of the input gear; and the fourth intermediate gear being biased such that when the output gear rotates in the second rotational direction, the fourth intermediate gear engages the output gear at the rear, relative to the rotational direction of the input gear, sides of the tooth flanks of the output gear.

6. A gear mechanism according to claim 5 in which a helix angle of the helical gears of the input, output and intermediate gears is defined by the following inequality:

$$tan\beta < \mu \cdot r/rs$$

where $\beta$: helix angle of the helical gear rs: pitch circle radius of the spline r: pitch circle radius of the helical gear $\mu$: maximum static friction coefficient.

7. A gear mechanism according to claim 6 in which the input, output and intermediate gears are external gears.

8. A gear mechanism according to claim 6 in which the input and intermediate gears are external gears, and the output gear is an internal gear.

* * * * *